Nov. 24, 1942.    E. F. OHLENDORF    2,302,882

UNIVERSAL JOINT

Filed Aug. 2, 1941

INVENTOR
EMIL F. OHLENDORF
BY
ATTORNEYS

Patented Nov. 24, 1942

2,302,882

UNITED STATES PATENT OFFICE 2,302,882

UNIVERSAL JOINT

Emil F. Ohlendorf, Moline, Ill., assignor to Deere & Company, Moline, Ill., a corporation of Illinois Application August 2, 1941, Serial No. 405,161

7 Claims. (Cl. 64—17)

The present invention relates to universal joints for connecting shafts arranged for rotation at an angle, and is more particularly concerned with a new and improved universal joint for connecting a drive shaft with the seeder shaft of a disk tiller in which not only are the shafts disposed at an angle but, in addition, it is necessary that one shaft moves generally longitudinally relative to the other when adjusting the cut of the disks.

The object and general nature of the present invention is the provision of a universal joint which is strong and sturdy, yet includes a smaller number of parts than any joints heretofore adapted for this purpose. Specifically, it is a feature of this invention to provide a simple and sturdy universal joint which not only accommodates rotation of the shafts at an angle but also accommodates shifting movement of one shaft relative to the other. Further, it is a feature of this invention to provide a universal joint which has only one pair of trunnions, the second pivot axis of the joint being defined by a shaft rockably disposed in the trunnion block but held against rotation relative thereto, such rocking movement defining the other axis of the joint.

Still further, another feature of the present invention is the provision of an improved double universal joint, each including a yoke having a trunnion connection with a block and a shaft slidable in said block and rockable relative thereto about an axis normal to the axis of the yoke, and further, another feature of this invention is the provision of a double universal joint in which the yoke is made up of two parts suitably secured together so as to facilitate assembly about the trunnion blocks, and still further, an additional feature of this invention is the provision of a double universal joint in which the two members comprising the yoke, are identical parts, thereby reducing the cost of manufacture.

These and other objects and advantages of the present invention will be apparent to those skilled in the art after a consideration of the following detailed description, taken in conjunction with the accompanying drawing illustrating the preferred form.

Figure 1:
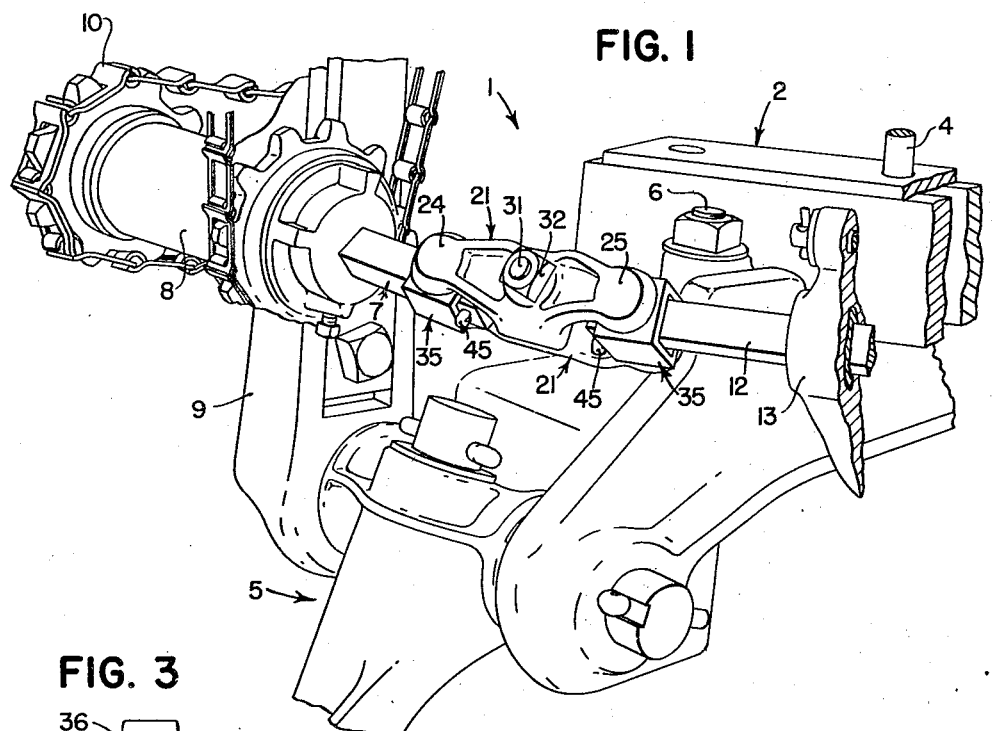
Figure 1 is a fragmentary perspective view of the rear portion of a disk tiller in which universal joint means, embodying the principles of the present invention, has been incorporated.
Figure 3:
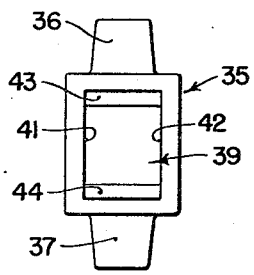
Figure 3 is a view of the trunnion block.

Referring now to the drawing and more particularly to Figure 1, the disk tiller, in which the principles of the present invention have been incorporated, is indicated by the reference numeral 1 and comprises a tool supporting frame, indicated by the reference numeral 2 and extends generally diagonally and carries the usual disks and seeding attachment. The rear portion of the frame 2 is supported by a rear truck 5 which is constructed along the lines of the implement shown in the patent to W. H. Silver, No. 2,192,333, dated March 5, 1940, to which reference may be had if necessary. The rear truck 5 is pivotally connected with the frame 2 so as to be adjustable about a generally vertical axis defined by a pivot bolt 4 and held in adjusted position by suitable means, such as one or more clamping bolts 6. The rear truck 5 includes ground wheels and the seeding attachment which is carried by the frame 2 includes a seeding shaft which may be driven from the ground wheels, as suggested in said prior patent. The present invention is particularly concerned with the provision of means for transmitting the drive from the ground wheels to the seeding shaft by universal joint means that accommodate the changes in the angular position of the rear truck 5 relative to the frame 2. According to the present invention, the drive shaft 7, preferably square in section, is supported by suitable bearing means 8 in a standard 9 forming a part of the rear truck 5 and driven by a chain 10 or other suitable means operatively connected to derive power from one of the ground wheels of the truck 5. The present invention is not concerned with the details per se of the means for transmitting the drive from the ground wheel to the drive shaft 7. The seeding attachment mentioned above as supported on the frame 2 includes seeding means that is operated by a jack shaft 12, which also preferably is of square section. The jack shaft 12 is supported by suitable bearing means 13 carried by the frame 2 and is connected in any suitable way to drive the seeding mechanism.

The drive is transmitted from the drive shaft 7, carried on the adjustable rear truck 5, to the jack shaft 12, carried on the frame 2, by universal joint means which is particularly constructed to accommodate changes in the angular position of these shafts and also to accommodate the generally longitudinal movement of one shaft toward the other when the truck frame 5 is adjusted relative to the frame 2. The connection between the shafts 7 and 12 comprises a double universal joint so as to secure uniform drive, and the connection is made up of a pair of yoke castings 21 preferably made as identical parts. Each yoke casting 21 includes a central section 23 and a pair of arms 24 and 25, each being provided with a trunnion-receiving socket 26. The center portion 23 of the yoke casting 21 is apertured, as at 27 (Figure 4), while at one side of the central section, the yoke casting is provided with a groove 28 and at the other side with a rib 29. The groove and rib are so formed that when two of the castings are assembled with the rib of one fitting in the groove of the other, the two parts are held in proper relation one with respect to the other with their arms 24 and 25 opposite each other. A bolt 31 is extended through the aligned central openings 27 of each pair of castings 21 and carries a nut 32 which, when tightened, secures the pair of members 21 together. The sockets 26 and the bolt receiving hole 27 are disposed in the central longitudinal plane of the member 21, whereby the latter may be said to be symmetrical about said plane. Therefore, when two of such members are placed face to face, the sockets 26 and the bolt holes of the members are in registry or alignment.

Figure 2:
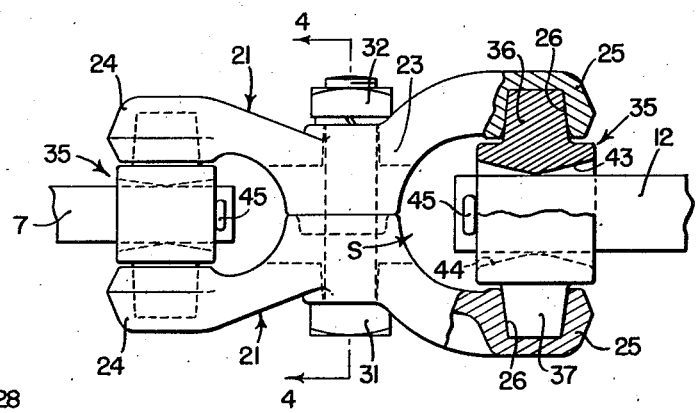
Figure 2 is a side view of the universal joint construction shown in Figure 1.
Figure 4:
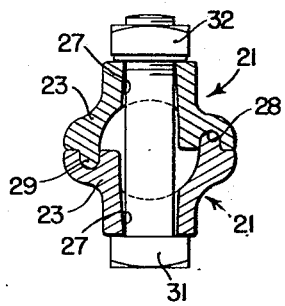
Figure 4 is a section taken generally along the line 4—4 of Figure 2.

Each pair of arms 24, 25 receive a trunnion block 35 having a pair of opposite truninons 36 and 37 which fit within the trunnion-receiving sockets 26, the bearing of the trunnions in the sockets defining one pivot axis of the universal joint. The trunnion block 35 is formed with an opening 39 therethrough which generally is square so as to correspond to the section of the associated shaft, 7 or 12. As best shown in Figures 2 and 4, two opposite walls 41 and 42 of the square opening 39 are disposed in parallel planes spaced apart the thickness of the shaft to be received therein. The other pair of walls 43 and 44 are curved, as best shown in Figure 2, the curvature being such that the shaft may take different angular positions within the associated trunnion member 35 while the shaft will be held against rotation in the member 35 principally by the contact of the flat walls 41 and 42 against the sides of the associated shaft. Also, each shaft is capable of sliding movement within the associated trunnion member 35 while the driving connection between the two parts are maintained. To this end, each pair of arms 24, 25 are made sufficiently long to provide a space S between the central portions 23 of the castings 21 and the end of the shaft 12, and the length of the arms may be whatever is desired and is necessary to secure the required extent of sliding movement of each shaft within its associated trunnion member 35. The sliding movement is limited by a cotter 45 passed through a hole at the inner end of the shafts 7 and 12. By virtue of the curvature of the walls 43 and 44, each shaft is capable of angular movement about an axis relative to the associated trunnion member 35 that is perpendicular to the axis defined by the trunnions 36 and 37. By virtue of this construction, each universal joint proper is formed with only two trunnions and a pair of arms, thereby eliminating the second pair of trunnions, bearings and associated parts conventionally present in ordinary universal joints. Also, by virtue of the fact that each yoke casting 21 is identical, the construction of a double universal joint, necessary to secure uniform drive, is made more simple and inexpensive, and involves fewer parts than heretofore. Further, each universal joint accommodates a certain amount of sliding movement of the associated shaft, not by the provision of extraneous splines or the like, but by virtue of the relation of parts by which the second axis of the universal joint is established. Therefore, with fewer parts than heretofore, not only does the present invention provide a universal joint but, moreover, secures the advantage of longitudinal movement without additional parts.

What I claim, therefore, and desire to secure by Letters Patents is:

1. A universal joint comprising a yoke formed of two identical parts, each having an arm, a groove and a projection, said groove and projection being formed so that when the projection on each part engages the groove on the other part, said arms are disposed in opposed relation, means securing said parts together with said arms in said opposed relation, and a trunnion member pivoted in said arms.

2. In a double universal joint, a pair of identical yoke members, each having an arm at one end and a section formed with a lug and a recess in spaced apart relation, each arm having trunnion-receiving means, and the lug and recess on each of said yoke members being arranged on opposite sides of and at substantially equal distances from the axis of symmetry of said yoke member, so that, when the lug on each yoke member engages the recess on the other yoke member, said yoke members are connected together with their arms in opposed relation and with the respective trunnion-receiving means in alignment.

3. A double universal joint comprising a pair of identical yoke members, each having an arm at its opposite ends and a central section formed with a lug and a recess in spaced apart relation, each arm having trunnion-receiving means, the lug and recess on each of said yoke members being arranged on opposite sides of and at equal distances from the axis of symmetry of said yoke member, so that, when the lug on each yoke member engages the recess on the other yoke member, said yoke members are connected together with their arms in opposed relation and with the respective trunnion-receiving means in alignment, the central portions of said yoke members having registering apertures, means passing through said registering openings for fastening said yoke members together with the lugs and recesses in interengaging relation, and companion universal joint parts pivoted to said pairs of arms.

4. A double universal joint comprising a pair of identical yoke members, each having an arm at one end and a connecting section formed with a lug and a recess in spaced apart relation, each arm having trunnion-receiving means and the lug and recess on each of said yoke members being arranged on opposite sides of and at equal distances from the axis of symmetry of said yoke member, so that, when the lug on each yoke member engages the recess on the other yoke member, said yoke members are connected together with their arms in opposed relation and with the respective trunnion-receiving means in alignment, a trunnion block pivoted to said pair of arms and having an opening therethrough, a shaft extending into and slidable longitudinally in the opening in said trunnion block a distance corresponding to the amount of extension of said arms, said shaft being slidable inwardly until it engages the assembled connecting sections of said yoke members, said opening being formed so that the shaft is held against rotation in said trunnion block but is capable of swinging relative to the trunnion block about an axis perpendicular to the pivot axis between the trunnion block and the pair of arms receiving said block, and means on the inner end of the shaft cooperating with said block to prevent inadvertent withdrawal of said shaft from said block.

5. A yoke for use in a universal joint, comprising a member symmetrical about a plane and having a lug at one side of said plane and a lug-receiving recess at the other side of said plane, at equal distances, said recess being of substantially the same dimensions as said lug and said lug and recess being arranged directly opposite one another in a line substantially perpendicular to said plane of symmetry.

6. A universal joint comprising a yoke formed of two identical parts, each having an arm, a recess and a projection, said recess and projection being formed so that when the projection on each part engages the recess on the other part, said arms are disposed in opposed relation, means securing said parts together with said arms in said opposed relation, and a trunnion member pivoted in said arms.

7. In a universal joint, a trunnion-receiving yoke formed of two identical parts, each having an arm, a recess and a projection, said recess and projection being formed so that when the projection on each part engages the recess on the other part, said arms are disposed in opposed relation, and means securing said parts together with said arms in said opposed relation.

EMIL F. OHLENDORF.